Patented Aug. 25, 1931

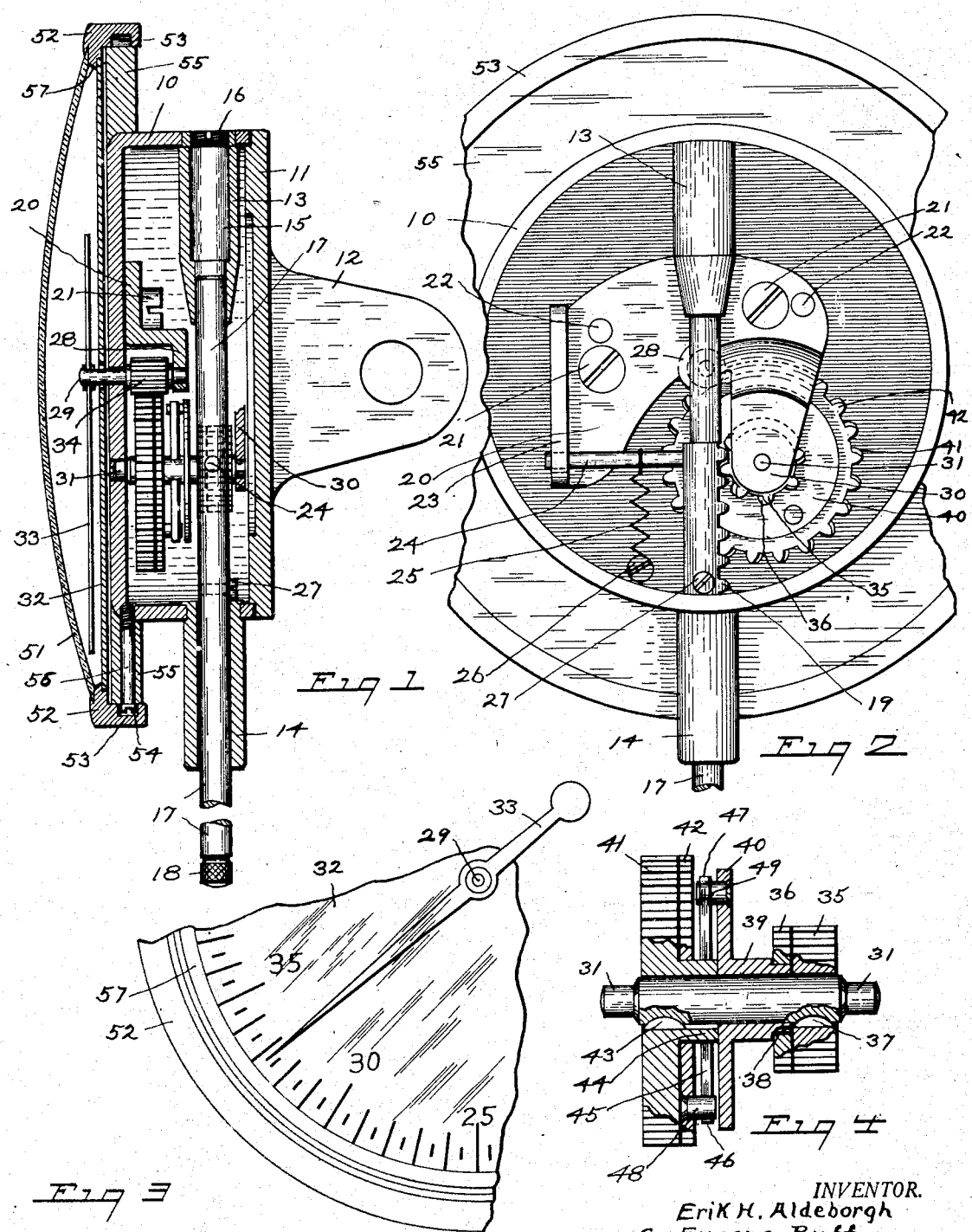

1,820,370

UNITED STATES PATENT OFFICE

ERIK H. ALDEBORGH AND CRISTIAN EUGENE RUF, OF POUGHKEEPSIE, NEW YORK, ASSIGNORS TO STANDARD GAGE COMPANY, INC., A CORPORATION OF NEW YORK

DIAL GAUGE

Application filed March 2, 1928. Serial No. 258,525.

This invention relates to a gauge of the dial indicator type, although the same or similar mechanism may be used in the construction of other types of dial gauges, calipers, etc., used for measuring in checking or production work, where a very accurate instrument is required.

In most of the gauges of this type now in use, trouble and inaccuracy of measurement are apt to occur through wear, and lost motion in the transmission of the movement from the work contact means to the indicating hand of the dial, and while devices have been devised to overcome this fault, they are delicate, complicated and easily gotten out of order.

The object of this invention is to provide a dial indicator gauge of the class in which gears are employed for the operating mechanism, and novel and positive means embodied therein to prevent any lost motion, back lash or noise, and to take up all wear in an automatic manner through the train of gears employed.

Another object being to provide such a gauge, that by its construction shall have a body portion that shall be capable of having dials and hands of different sizes attached thereto, obviating the necessity of constructing a separate gauge body and operating mechanism for each size of dial required.

Still another object being to so contrast the coloring of the dial mounting as to prevent shadows and to illuminate the dial and the graduations thereon, to be readily seen in a poor light.

With these and other objects in view, our invention consists in certain construction and combination of parts as will hereinafter be fully described and claimed, and illustrated in the accompanying drawings which form a part hereof and in which like figures of reference refer to corresponding parts in all of the views, and it is to be understood that slight changes may be made without departing from the spirit of the invention.

In the drawings:—

Figure 1 is a vertical sectional view, somewhat enlarged of such a dial indicating gauge, showing the construction thereof.

Figure 2 is a rear view of the same, with the back plate removed therefrom, to expose the mechanism.

Figure 3 is a partial view of the front of the dial and the indicating hand.

Figure 4 is an enlarged detail view of the compound gear unit, which is shown partly in section.

Referring to the drawings:—

The gauge comprises a casing or shell 10, circular in form, but which may be of any other suitable form desired, and of any suitable material, and to which is secured in any of the well known ways, a back plate 11, which is formed with the lug 12, for attachment to a tool post, base, standard or any desired mounting or holding means for the gauge while in use.

Within the side of this casing 10, at diametrical opposite positions are secured the bearing sleeves 13 and 14; the bearing sleeve 13 being relieved as at 15, and provided with a threaded plug 16, closing its outer end; while the bearing sleeve 14 has a straight bore for its entire length.

Slidably mounted within said alined bearing sleeves 13 and 14, is a plunger rod 17, which is formed at its lower end with a work contact 18, preferably hardened and ground; and about midway its length and within the casing 10, it is provided with the rack teeth 19, of any suitable number and pitch.

To the bottom of the casing 10, and below the bearing 13 and the plunger rod 17, is secured a member 20 by the screws 21 and the locating dowel pins 22; and this member 20 is formed with a flange 23, which is provided with a slot which acts as a guide, and within which rides a pin 24 which is attached to, and extends at right angles from the side of the plunger rod 17, retaining said rod 17 from turning in the bearings 13 and 14, while allowing its free up and down movement; while a spring 25 attached to said pin 24 and to a screw 26 threaded into the bottom of the casing 10, holds the plunger 17 in a normal position with the indicating hand 33 at the zero point on the dial; this movement being limited by the stop 27 secured in said plunger 17 and contacting with the top of the bearing sleeve 14.

The member 20 is also formed with a lug 28 having a bearing formed therein for the staff 29 which holds the hand; and a lug 30 also formed with a bearing for the shaft 31 on which the compound gears are mounted, and which will be hereinafter more fully described.

Within the bearing in the lug 28 and an alined bearing formed in the bottom of the casing 10, is rotatably mounted the staff 29, on the outer end of which and outside of the dial 32 is mounted the indicating hand 33; and said staff 29 also carries the pinion gear 34, by which the hand is moved.

For transmitting the movement from the rack teeth 19 of the plunger 17 to the pinion 34, to swing the hand 33 without any lost motion, there is provided a compound and compensating gearing, mounted on a shaft 31 freely rotating in the alined bearings in the lug 30 and the bottom of the casing 10.

Referring to Figure 4 of the drawings, this gearing comprises a two-part gear 35 and 36, in mesh with the rack 19; the part 35 being secured to the shaft 31 by the key 37; while the part 36 is secured by the key 38 to the hub 39 of a flanged disk 40, which is mounted on the shaft 31 in a freely rotatable manner.

On the opposite end of the shaft 31 is also a two-part gear 41 and 42; both of which are in mesh with the pinion 34 on the staff 29; the gear part 41 being secured to the shaft 31 by the key 43 and the gear 42 being mounted in a freely rotative manner on the hub 44 of said gear 41.

The hub 44 of the gear 41 is provided with a transverse saw cut (see Figure 1) and secured therein in some suitable manner, such as staking, is a flat or leaf spring 45, which is formed at its ends with the hooks 46 and 47, turned in opposite directions; the hook 46 being engaged by a stud 48 secured in and projecting from the side of the gear part 42, while the hook 47 is similarly engaged by a stud 49 secured to and projecting from the side of the disk 40, in such a manner that if the disk 40 is turned in relation to the gear part 42, there will be a tension applied to the spring 45; and in the assembly of the unit, the disk 40 is so turned through an arc equal to one or more of the teeth of said gears, before meshing the same with either the rack 19 or the pinion 34, thus creating a follow up or tension of the gear parts 36 and 42 to hold their teeth out of alinement with the teeth of their respective gears 35 and 41, presenting what might be termed a resilient tooth to mesh with the teeth of the rack and the pinion, thus preventing all lost motion, back lash and noise, and providing gears that will take up all wear in an automatic manner.

This gear unit being entirely self-contained and not depending in any way for its operation on a spiral or hair spring having one of its ends secured to the casing, is so constructed that it may be assembled and carried as a unit.

The dial 32 and the cover glass 51, shown in the drawing are of the larger size, and are retained in the usual manner in a rim 52; said rim 52 being mounted in some suitable manner as a groove 53 coacting with the screw heads 54, to retain the rim 52 to a ring or spacing flange 55 which is secured to the casing 10 by one or more screws 56 which are threaded therein; or in case a smaller dial and cover is used, the mounting rim may be attached direct to the casing and the ring 55 not employed; this ring 55 being employed as a filler of space for the larger dials.

For producing all the illumination possible on the dial 32, the rim 52 is plated a black, and the beveled portion 57 of said rim is bright nickeled or polished, which by the contrast in color will reflect light on the face of the dial, intensifying the light and preventing shadows.

Having thus described our invention, what we claim as new and desire to secure by Letters Patent, is.

1. A dial indicating gauge, comprising in combination with a casing having a dial and an indicating hand for said dial and a pinion for moving the hand, a reciprocating plunger mounted in said case and having a work contacting end, and a rack formed on said plunger within said casing, of a compound gearing mounted within said casing for transmitting movement from said rack to said pinion, means carried by and within said compound gearing comprising a flanged disk and a flat spring for preventing lost motion between said pinion and said gearing, and between said rack and said gearing.

2. A dial indicating gauge, comprising in combination with a casing, a dial and indicating hand for the casing, a pinion for moving said hand, and a plunger formed with a rack, of a compensating gear unit mounted in said casing and adapted to transmit movement from said rack to said pinion, means carried by said gear unit for preventing lost motion between said gear unit and either the pinion or the rack, comprising a flanged disk and a flat spring.

3. A dial indicating gauge, comprising in combination with a casing having a dial and hand, a pinion for moving said hand and a plunger having rack teeth formed thereon, of a member secured to said casing, bearings and a guide formed therein, means carried by said plunger and coacting with said guide to prevent rotary movement of said plunger, and a compensating compound gear unit mounted in said bearings in operative relation with said rack and said pinion, comprising a flanged disk and a flat spring.

In testimony whereof we affix our signatures.

ERIK H. ALDEBORGH.
C. EUGENE RUF.